United States Patent [19]

Davies et al.

[11] Patent Number: 4,464,703

[45] Date of Patent: Aug. 7, 1984

[54] METAL CLAD SWITCHGEAR HAVING EXTERIOR VENTILATION SHAFTS

[75] Inventors: Norman Davies; Ronald E. Vaill, both of Irwin, Pa.

[73] Assignee: Westinghouse Electric Corp., Pittsburgh, Pa.

[21] Appl. No.: 397,256

[22] Filed: Jul. 12, 1982

[51] Int. Cl.³ .............................................. H02B 1/04
[52] U.S. Cl. .................................. 361/342; 361/334; 361/379; 200/50 AA
[58] Field of Search .......................... 174/16 R, 16 B; 200/50 AA; 361/334–339, 341–345, 379, 381–383, 390, 391, 428

[56] References Cited

U.S. PATENT DOCUMENTS

| | | | |
|---|---|---|---|
| 4,002,955 | 1/1977 | Eggert | 361/391 |
| 4,351,990 | 9/1982 | Hesselbart | 361/336 |
| 4,369,484 | 1/1983 | Fugate | 361/334 |

FOREIGN PATENT DOCUMENTS

| | | | |
|---|---|---|---|
| 2414823 | 10/1974 | Fed. Rep. of Germany | 361/379 |
| 47901 | 1/1979 | Japan | 361/379 |

*Primary Examiner*—G. P. Tolin
*Attorney, Agent, or Firm*—M. J. Moran

[57] ABSTRACT

There is proved by this invention a novel metal clad switchgear construction wherein the exterior walls are recessed to form areas disposed to provide ventilation shafts between adjacent units and increased access to the primary terminals.

2 Claims, 4 Drawing Figures

METAL CLAD SWITCHGEAR HAVING EXTERIOR VENTILATION SHAFTS

BACKGROUND OF THE INVENTION

1. Field of the Invention

This invention relates generally to metal clad switchgear and more particularly to metal clad switchgear cable access and ventilation compartments.

2. Description of the Prior Art

In the design of metal clad switchgear considerable attention must be given to the problems of ventilation and access to the cable compartment. Heating of the primary contacts due to large currents can affect the operating characteristics of the switchgear if uncontrolled. This is especially true for the new modular designs employing back-to-back, side-to-side, and top and bottom arrangements where the accumulative effect of the heating can reduce reliability. The heating that results from the large current carrying capabilities of these units must therefore be controlled to increase their safety and reliability. Force cooling of the contacts is an undesirable alternative in that it requires utilizing additional space and energy.

SUMMARY OF THE INVENTION

There is provided by this invention a new metal clad switchgear construction that increases ventilation and access in cable compartments for modular switchgear designs by sharing the space for access and ventilation between adjacent units utilizing recessions in the exterior walls of the housing to form ventilation shafts. Because this space is outside of the primary compartment such sharing does not violate metal clad switchgear standards, yet it does allow a significant increase in cabling ease to the customer as well as improved ventilation.

DESCRIPTION OF THE PREFERRED EMBODIMENT

Figure 1:
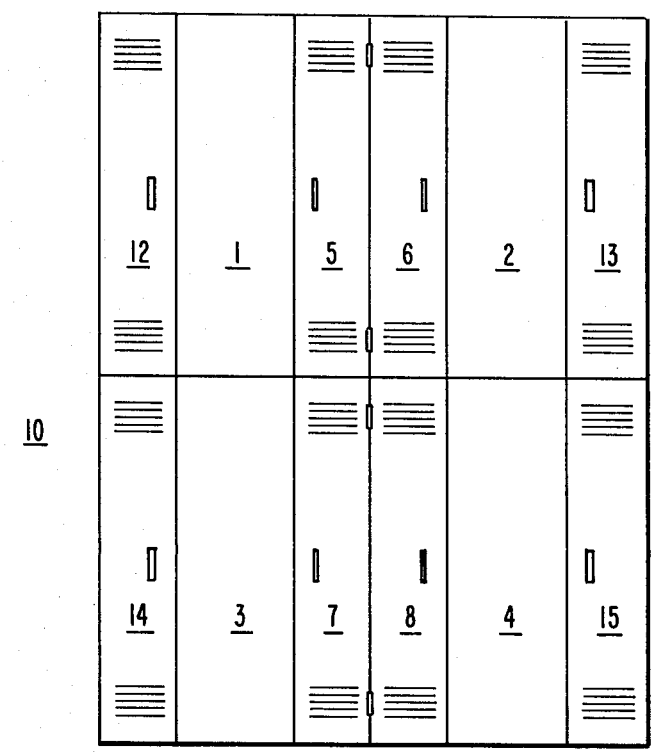
FIG. 1 is a front view of a metal clad switchgear design incorporating the principles of this invention.

There is shown in FIG. 1 a metal clad switchgear 10 having switchgear units 1, 2, 3 and 4. Each switchgear unit has cable access and ventilation doors 5, 6, 7 and 8. End units may have compartments 12, 13, 14 and 15.

Figure 3:
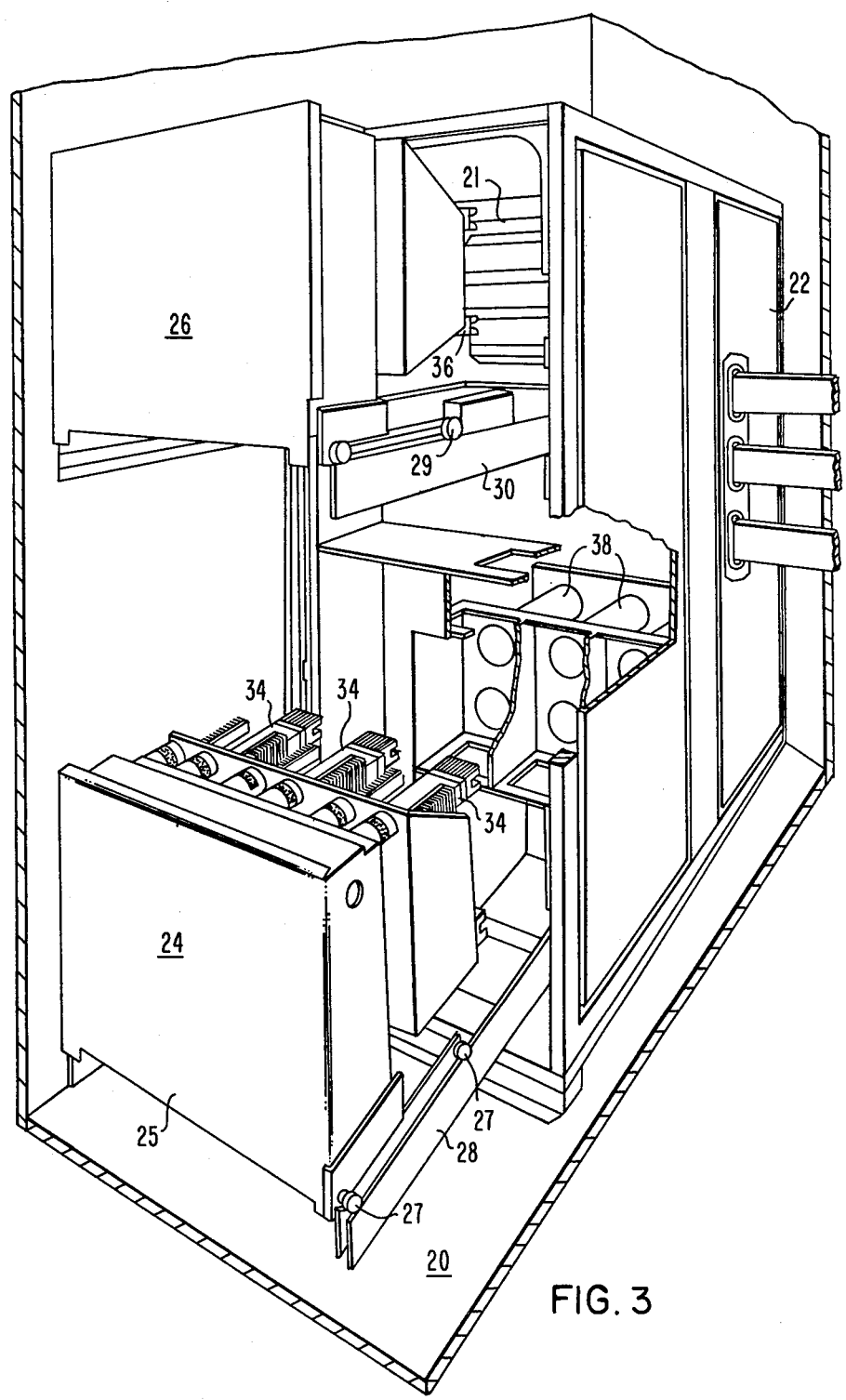
FIG. 3 is an exploded perspective view with parts broken away of a metal clad switchgear module incorporating the principles of this invention.

Referring now to FIG. 3 there is shown a metal clad switchgear module 20 which includes a metal cabinet or enclosure 22 having tandemly, vertically disposed therein drawout three-phase vacuum circuit interrupter apparatus 24 and 26. The front panel 25 of the circuit interrupter apparatus may have controls thereon for manually operating the circuit interrupter apparatus. The lower circuit interrupter apparatus 24 as shown in FIG. 3, is movably disposed by way of wheels 27 on rails 28 for moving the circuit breaker apparatus 24 into and out of the metal cabinet 22 wherein the 3-phase terminals 34 are disposed to make electrical contact with high-voltage terminals (not shown) in the rear of the cabinet 22. Likewise, the upper circuit interrupter apparatus 26 is movably disposed by way of wheels 29 on rails 30 for moving the upper circuit interrupter apparatus into and out of the cabinet wherein three-phase terminals 36 make electrical contact with terminals (not shown) in the rear of the cabinet 22. Movable shutters such as shown at 21 are interposed to cover the high voltage terminals in the rear of the cabinet for shielding the high-voltage terminals from inadvertent contact when the breakers 24 and 26 are drawn out. The barrier 21 is broken away from the circuit interrupter apparatus 24 to illustrate the insulating bottles 38 which house the line primary contacts for the switchgear assembly. Horizontal bus bars electrically connect adjacent units.

Figure 2:
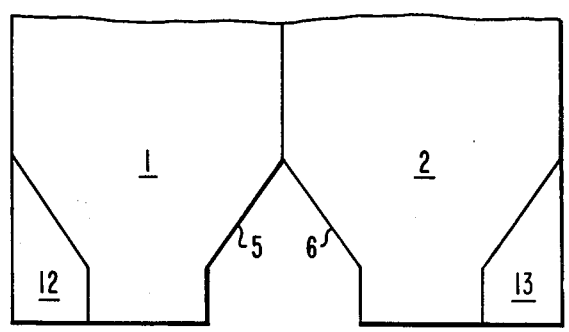
FIG. 2 is a top view of the metal clad switchgear shown in FIG. 1.
Figure 4:
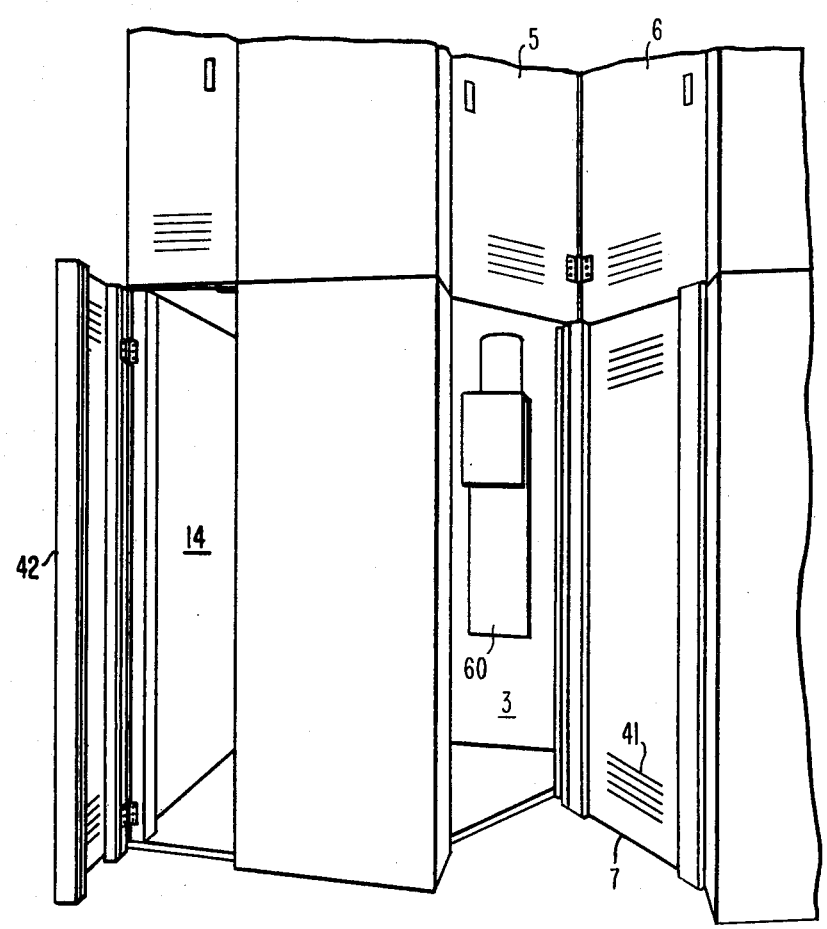
FIG. 4 is a partial perspective view of the cable access and ventilation compartments of a metal clad switchgear incorporating the principles of this invention.

Referring now to FIGS. 2 and 4 when adjacent two high metal clad switchgear configurations as shown in 2 are used there is an inherent difficulty in gaining access to the cables of one or the other of the feeder circuits. In addition, space efficiency eliminates the possibility of using fan-cooled ventilation. Therefore, proper ventilation must be built into the metal clad switchgear construction. As can be readily seen in FIG. 2, a metal clad switchgear construction is proposed that would allow adjacent units to share ventilation and cable access space. FIG. 4 illustrates that each switchgear unit has a cable access door such as 7 having vents 41. End units such as 14 may have access doors 42. The novel recessed design in the housing 22 allows easy access to the primary terminals while providing ventilation paths between adjacent units. This unique design provides a unique construction such that both access area and ventilation area to the inner cables and primary terminals 60 are significantly increased.

It can be readily seen that there is provided by this invention a novel metal clad switchgear construction that provides increased ventilation and access to the primary terminals. Although there has been illustrated and described a specific embodiment, it is clearly understood that the same were merely for purposes of illustration and that changes and modifications may be readily made therein by those skilled in the art without departing from the spirit and scope of this invention.

We claim as our invention:

1. A metal clad switchgear construction, comprising:
   (a) a housing means for enclosing electrical apparatus;
   (b) a plurality of compartments within said housing means;
   (c) a plurality of stationary contacts disposed within said plurality of compartments;
   (d) a plurality of removable circuit breaker means mounted in the front of said housing means and having removable contacts for making electrical engagement with said stationary contacts;
   (e) said housing means having a rear compartment enclosing a bus means for connection to incoming electrical power cables; and
   (f) said rear compartment having recessions in its exterior walls with doors therein providing an access to the bus means.

2. A metal clad switchgear construction as recited in claim 1 wherein the recessions in the exterior walls are disposed to form external ventilation shafts when abutted with adjacent units having vents in the doors contained therein providing ventilation to the bus means.

* * * * *